(12) United States Patent
Cosner et al.

(10) Patent No.: US 12,442,642 B2
(45) Date of Patent: Oct. 14, 2025

(54) STAR TRACKERS FOR RANGE DETERMINATION IN RENDEZVOUS AND PROXIMITY OPERATIONS

(71) Applicant: Raytheon Company, Waltham, MA (US)

(72) Inventors: Christopher Mark Cosner, Manhattan Beach, CA (US); Pavan Daryanani, Torrance, CA (US); Joseph Daniel Khair, Torrance, CA (US); Orion Derek Radtke, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 355 days.

(21) Appl. No.: 17/738,447

(22) Filed: May 6, 2022

(65) Prior Publication Data
US 2023/0358545 A1  Nov. 9, 2023

(51) Int. Cl.
*G01C 21/00* (2006.01)
*B64G 1/36* (2006.01)
*G01C 21/24* (2006.01)

(52) U.S. Cl.
CPC ............ *G01C 21/24* (2013.01); *B64G 1/361* (2013.01)

(58) Field of Classification Search
CPC ........ G01C 21/24; G01C 3/14; G01C 21/025; B64G 1/361
See application file for complete search history.

(56) References Cited

U.S. PATENT DOCUMENTS

| | | | |
|---|---|---|---|
| 4,831,531 A | 5/1989 | Adams et al. | |
| 6,133,870 A * | 10/2000 | Wehner | H04B 7/18519 701/531 |
| 7,823,837 B2 | 11/2010 | Behrens et al. | |
| 8,069,382 B2 | 11/2011 | Aritome | |
| 9,740,465 B1 | 8/2017 | Coleman et al. | |
| 10,061,027 B2 | 8/2018 | Goldberg et al. | |
| 2007/0228219 A1 | 10/2007 | Behrens et al. | |
| 2011/0299730 A1* | 12/2011 | Elinas | G06T 7/73 382/103 |

(Continued)

OTHER PUBLICATIONS

Segal, Shai & Carmi, Avishy & Gurfil, Pini. (2011). Vision-based relative state estimation of non-cooperative spacecraft under modeling uncertainty. IEEE Aerospace Conference Proceedings. 1-8. 10.1109/AERO.2011.5747479. (Year: 2011).*

(Continued)

*Primary Examiner* — Anne Marie Antonucci
*Assistant Examiner* — Jordan T Smith
(74) *Attorney, Agent, or Firm* — CANTOR COLBURN LLP

(57) ABSTRACT

A space vehicle system includes a first star tracker disposed at a first location on or near the space vehicle, the first star tracker configured to obtain first images of a space object and stars and a second star tracker disposed at a second location on or near the space vehicle, at a distance D from the first location. The second star tracker is configured to obtain second images of the space object and the stars and the first images and the second images being stereoscopic images. The system also includes a processor configured to determine an estimate of a range from the space vehicle to the space object based on the first images and the second images.

20 Claims, 4 Drawing Sheets

(56) References Cited

U.S. PATENT DOCUMENTS

| | | | | |
|---|---|---|---|---|
| 2012/0059536 | A1* | 3/2012 | Pepicelli | B64C 39/024 701/11 |
| 2015/0219744 | A1* | 8/2015 | Eikenberry | G01S 5/163 348/144 |
| 2018/0346152 | A1 | 12/2018 | Bryan et al. | |
| 2019/0288771 | A1* | 9/2019 | Metzger | H04W 24/02 |
| 2020/0377237 | A1 | 12/2020 | Hanson et al. | |
| 2022/0063842 | A1 | 3/2022 | Weiss et al. | |
| 2022/0127023 | A1 | 4/2022 | Norwood | |
| 2022/0245833 | A1* | 8/2022 | Curti | G06T 7/246 |
| 2024/0400232 | A1 | 12/2024 | Cosner et al. | |
| 2025/0026499 | A1* | 1/2025 | Koumandakis | B64G 1/369 |

OTHER PUBLICATIONS

Dario Spiller et al., On-orbit recognition of resident space objects by using star trackers, Acta Astronautica, vol. 177, vol. 177, 2020, pp. 478-496, ISSN 0094-5765, https://doi.org/10.1016/j.actaastro.2020.08.009. (https://www.sciencedirect.com/science/article/pii/S0094576520304963) (Year: 2020).*

Shrivastava, Shubham. (2020). Stereo Vision Based Object Detection Using V-Disparity and 3D Density-Based Clustering. 10.1007/978-3-030-17798-0_33. (Year: 2020).*

L. Felicetti and M. R. Emami, "Spacecraft formation for debris surveillance," 2017 IEEE Aerospace Conference, Big Sky, MT, USA, 2017, pp. 1-12, doi: 10.1109/AERO.2017.7943750. (Year: 2017).*

D. Zuehlke, T. Henderson, T. Alan Lovell and A. Sizemore, "An End-to-End Process for Local Space Situational Awareness from Optical Observers," 2020 IEEE/ION Position, Location and Navigation Symposium (PLANS), Portland, OR, USA, 2020, pp. 1547-1555, doi: 10.1109/PLANS46316.2020.9109868. (Year: 2020).*

Shrivastava, Shubham "Stereo Vision Based Object Detection Using V-Disparity and 3D Density-Based Clustering", CVC 2019, AISC 944, 2020, pp. 408-410.

Final Office Action May 27, 2025 in U.S. Appl. No. 17/738,440 16 pages.

* cited by examiner

STAR TRACKERS FOR RANGE DETERMINATION IN RENDEZVOUS AND PROXIMITY OPERATIONS

BACKGROUND

The present disclosure relates to space vehicles and, more particularly, to star trackers for a range determination used in rendezvous and proximity operations (RPOs).

Space vehicles may be used for a number of purposes including transport of payload or passengers and tourism. A rideshare-capable space vehicle refers to one that shares a launch vehicle with a primary payload. That is, one or more rideshare-capable space vehicles are those with sufficiently small volume and mass so that they occupy the margin available in the launch vehicle's capability after it has accommodated its primary payload. A rideshare-capable space vehicle, like the launch vehicle that deploys it, may accommodate multiple payloads. For example, the rideshare-capable space vehicle may house a resident space object (RSO) which may be a satellite that is deployed by the space vehicle subsequent to its own deployment from the launch vehicle. Subsequent to deployment of the RSO, the ride-share capable vehicle may perform rendezvous proximity operation (RPO) maneuvers around the RSO.

SUMMARY

According to one embodiment a system in a space vehicle is disclosed. The system may include: a first star tracker disposed at a first location on or near the space vehicle, the first star tracker configured to obtain first images of a space object and stars; a second star tracker disposed at a second location on or near the space vehicle, at a distance D from the first location, the second star tracker configured to obtain second images of the space object and the stars and the first images and the second images being stereoscopic images; and a processor configured to determine an estimate of a range from the space vehicle to the space object based on the first images and the second images.

In addition to or as an alternative to any prior system, the processor can be configured to determine xa as a position of the space object in one dimension based on the first images and to determine xb as a position of the space object in the one dimension based on the second images.

In addition to or as an alternative to any prior system, the processor is configured to compute the range R from the space vehicle to the space object as:

$$R = f \cdot \left(\frac{D}{xa + xb}\right),$$

where f is the focal length of the first star tracker and the second star tracker.

In addition to or as an alternative to any prior system, the processor can further be configured to determine a second estimate of the range from the space vehicle to the space object based on an absolute position of the space vehicle and an absolute position of the space object from a global navigation satellite system.

In addition to or as an alternative to any prior system processor can be configured to weight the estimate of the range and the second estimate of the range as part of a tracking process using a Kalman filter.

In addition to or as an alternative to any prior system, the processor can be configured to implement a machine learning algorithm to weight the estimate of the range and the second estimate of the range and determine a combined estimate of the range from the space vehicle to the space object.

In addition to or as an alternative to any prior system the processor can process a massless payload, the massless payload being dynamically modifiable software and including an algorithm to weight the estimate of the range and the second estimate of the range and determine a combined estimate of the range from the space vehicle to the space object.

In addition to or as an alternative to any prior system the massless payload includes one or more algorithms to determine one or more actions to be taken by the space vehicle based on the combined estimate of the range from the space vehicle to the space object.

In addition to or as an alternative to any prior system, the system can further include a controller configured to control one or more operational systems to perform the one or more actions indicated by the massless payload, wherein the controller software is an interface between the massless payload and the operational systems and does not change based on dynamic changes in the massless payload.

In addition to or as an alternative to any prior system, the massless payload is uploaded to the space vehicle from a ground station.

Also disclosed is a method that includes: disposing a first star tracker at a first location on or near a space vehicle, the first star tracker configured to obtain first images of a space object and stars; disposing a second star tracker at a second location on or near the space vehicle, at a distance D from the first location, the second star tracker configured to obtain second images of the space object and the stars and the first images and the second images being stereoscopic images; and providing instructions to a processor to determine an estimate of a range from the space vehicle to the space object based on the first images and the second images.

In addition to or as an alternative to any prior method, providing the instructions can include instructions to determine xa as a position of the space object in one dimension based on the first images and to determine xb as a position of the space object in the one dimension based on the second images.

In addition to or as an alternative to any prior method, providing the instructions includes instructions to compute the range R from the space vehicle to the space object as:

$$R = f \cdot \left(\frac{D}{xa + xb}\right),$$

where f is the focal length of the first star tracker and the second star tracker.

In addition to or as an alternative to any prior method, providing the instructions includes instructions to determine a second estimate of the range from the space vehicle to the space object based on an absolute position of the space vehicle and an absolute position of the space object from a global navigation satellite system.

In addition to or as an alternative to any prior method, the providing the instructions includes instructions to weight the estimate of the range and the second estimate of the range as part of a tracking process using a Kalman filter.

In addition to or as an alternative to any prior method, providing the instructions includes instructions to implement a machine learning algorithm to weight the estimate of the range and the second estimate of the range and determine a combined estimate of the range from the space vehicle to the space object.

In addition to or as an alternative to any prior method, providing the instructions is as a massless payload, the massless payload being dynamically modifiable software and including an algorithm to weight the estimate of the range and the second estimate of the range and determine a combined estimate of the range from the space vehicle to the space object.

In addition to or as an alternative to any prior method, the massless payload includes one or more algorithms to determine one or more actions to be taken by the space vehicle based on the combined estimate of the range from the space vehicle to the space object.

In addition to or as an alternative to any prior method, the method can further include configuring a controller to control one or more operational systems to perform the one or more actions indicated by the massless payload, wherein the configuring the controller is as an interface between the massless payload and the operational systems with software that does not change based on dynamic changes in the massless payload.

In addition to or as an alternative to any prior method, the method can further includes obtaining the massless payload as an upload to the space vehicle from a ground station.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments detailed herein relate to star trackers for a range determination in RPOs. A star tracker is an optical device with photocells or a camera and can measure the positions of stars from a space vehicle, for example. According to prior approaches, the positions of the stars obtained with a star tracker and the known positions of the same stars, as determined by astronomers, may be used to determine the orientation (i.e., attitude) of the space vehicle on which the star tracker is affixed.

According to one or more embodiments, stereoscopic imaging of a space object may be performed with a pair of star trackers. That is, a pair of star trackers positioned at different locations of a space vehicle may each obtain images of the same space object and stars at the same time. This stereoscopic imaging provides a depth dimension that allows an estimate of the range to the space object from the space vehicle. When available, a global navigation satellite system (GNSS), such as the global positioning system (GPS), may be a source for another range estimate based on absolute positions of the space object and the space vehicle. The range estimates obtained from the stereoscopic imaging and the GNSS information may be weighted and combined to obtain a more accurate relative range.

The range determination may further benefit from an architecture that allows the space vehicle to be used as a testbed for testing RPO algorithms. The architecture includes a controller that acts as middleware, a common interface that allows control of operational systems (e.g., thrusters) by software (referred to as a "massless payload") that may be uploaded to the space vehicle to dynamically modify or add algorithms. The massless payload (MPL) may include algorithms to estimate range using the star trackers or algorithms to combine range estimates from the star trackers and a GNSS system, for example.

Figure 1:
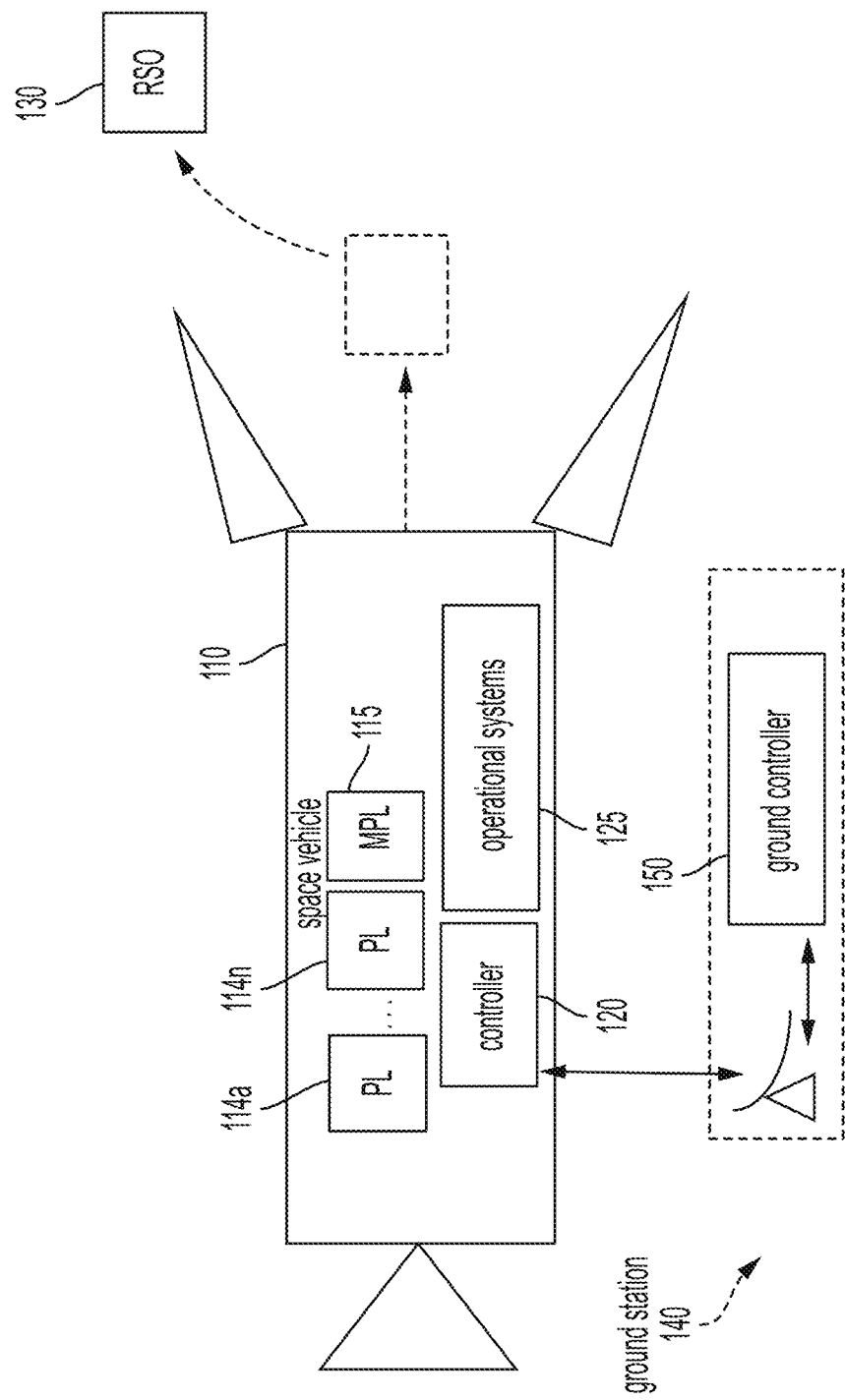
FIG. 1 illustrates deployment of a resident space object by a space vehicle with a testbed architecture according to one or more embodiments.

FIG. 1 shows a space vehicle 110 that uses star trackers 105 (FIG. 2) for relative ranging according to one or more embodiments. FIG. 1 illustrates deployment of an RSO 130 by a space vehicle 110 with a testbed architecture 300 (FIG. 3) according to one or more embodiments. The space vehicle 110 may be rideshare-capable, meaning that it has a sufficiently small volume and mass so that it occupied the margin available in a launch vehicle's capability after the launch vehicle accommodated its primary payload. Thus, the space vehicle 110 shown in FIG. 1 may have been deployed by the launch vehicle. The space vehicle 110 may include a number of payloads (PL) 114a through 114n (generally referred to as 114) in addition to the MPL 115 of interest. Exemplary payloads 114 include experimental payloads, telescopes, and materials for radiators (e.g., vanadium dioxide). As discussed with reference to FIG. 2, the MPL 115 may determine a range from the space vehicle 110 to the RSO 130 or another space object 210 using the star trackers 105 according to one or more embodiments.

The space vehicle 110 also includes a controller 120 and operational systems 125. The controller 120 is further discussed with reference to FIG. 2 and may include one or more memory devices and processors to generate commands to one or more operational systems 125 to control operations of the space vehicle 110. According to the testbed architecture 300, the controller 120 functions as middleware. That is, the controller 120 is common to any MPL 115 and need not change based on the particular algorithm being tested.

The controller 120 facilitates an interface between any test algorithms implemented by the MPL 115 and the operational systems 125, such as thrusters, that facilitate operation of the space vehicle 110 based on commands from the controller 120. A ground station 140 is shown communicating with the space vehicle 110. The ground station 140 includes a ground controller 150 that is also further discussed with reference to FIG. 2. The ground station 140 may provide the modified or new algorithms to be tested at the space vehicle 110 based on the testbed architecture 300 of the space vehicle 110. As discussed with reference to FIG.

4, the testbed architecture 300 may be used to test different algorithms for aspects of proximity operations, including the ranging that is performed using the star trackers 105 according to one or more embodiments.

Figure 2:
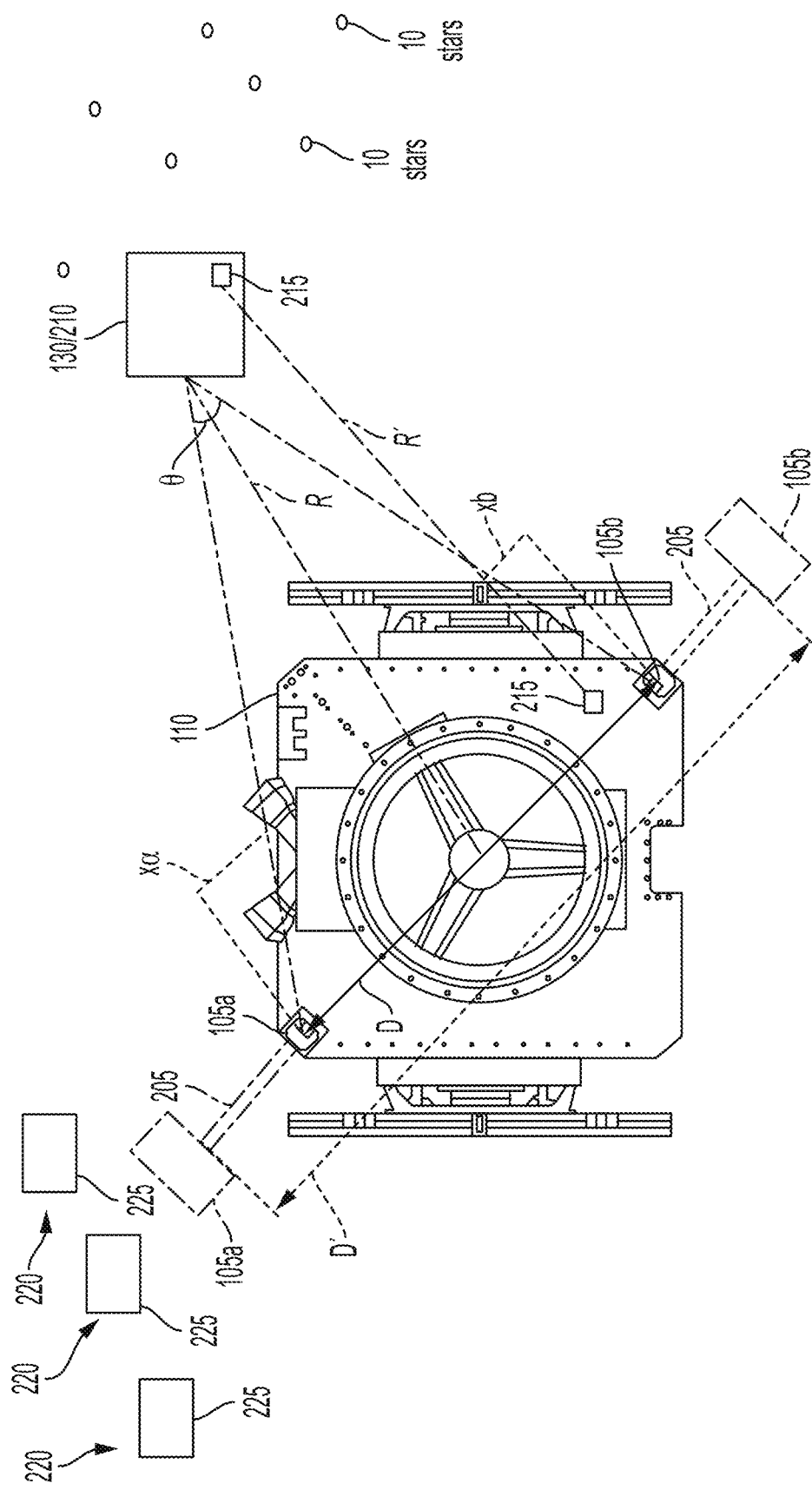
FIG. 2 depicts the star trackers used for relative ranging according to one or more embodiments.

FIG. 2 depicts the star trackers 105a, 105b (generally referred to as 105) used to determine range according to one or more embodiments. As shown, the star trackers 105 are disposed at different locations of the space vehicle 110 and are a distance D apart from each other. According to alternate embodiments, the star trackers 105 may each be deployed on a boom 205 to separate the star trackers 105 by a larger distance D' A space object 210, which may be an RSO 130 that was deployed by the space vehicle 110 as illustrated in FIG. 1, is shown at a range R from the space vehicle 110. Stars 10 that would be in the background of images of the space object 210 captured by the star trackers 105 are also indicated. The range R from the space vehicle 110 to the space object 210 is determined using the star trackers 105, as detailed, so that the space vehicle 110 may maneuver around the space object 210 as needed.

Each of the star trackers 105 obtains images of the space object 210 and stars 10 and indicates a two-dimensional position of the space object 210 in the images. That is, the star tracker 105a provides a distance xa in one of the dimensions, while the star tracker 105b provides the distance xb in the same dimension. The star trackers 105 have a focal length of. Thus, by also knowing the distance D (or D') between the two star trackers 105, the range R from the space vehicle 110 to the space object 210 may be determined as:

$$R = f \cdot \left(\frac{D}{xa + xb}\right) \qquad [\text{EQ. 1}]$$

Alternately, by aligning the stars 10 in the images obtained by the star tracker 105a with the same stars 10 in the images obtained by the star tracker 105b, the angular offset θ between the viewpoints of the two star trackers 105 may be determined. Trigonometric operations may then be used to determine the range R.

Satellites 225 that are part of a GNSS 220 (e.g., GPS) are also shown in FIG. 2. The space vehicle 110 and the space object 210 may each have a GNSS receiver 215 that obtains broadcasts from a number (e.g., three) of the satellites 225. Communication with GNSS satellites 225 to determine position is known and is only briefly described herein. The broadcasts from the satellites 225 and, more specifically, the time difference between the time of transmission indicated in each broadcast and the time of reception are used by each GNSS receiver 215 to determine its three-dimensional position. Thus, the absolute position of the space vehicle 110 and the space object 210 are obtained from the GNSS 220.

The space object 210 may communicate its position, as determined by its GNSS receiver 215, to the space vehicle 110 either directly or via the ground station 140. The range R' between the space vehicle 110 and space object 210 may then be determined based on a difference in their positions. The range R determined using the star trackers 105 and the range R' obtained via a GNSS 220 may be weighted and combined to obtain a more accurate estimate of the spacing between the space vehicle 110 and the space object 210 for purposes of performing proximity operations such as RPO. This is further discussed with reference to FIG. 4.

Figure 3:
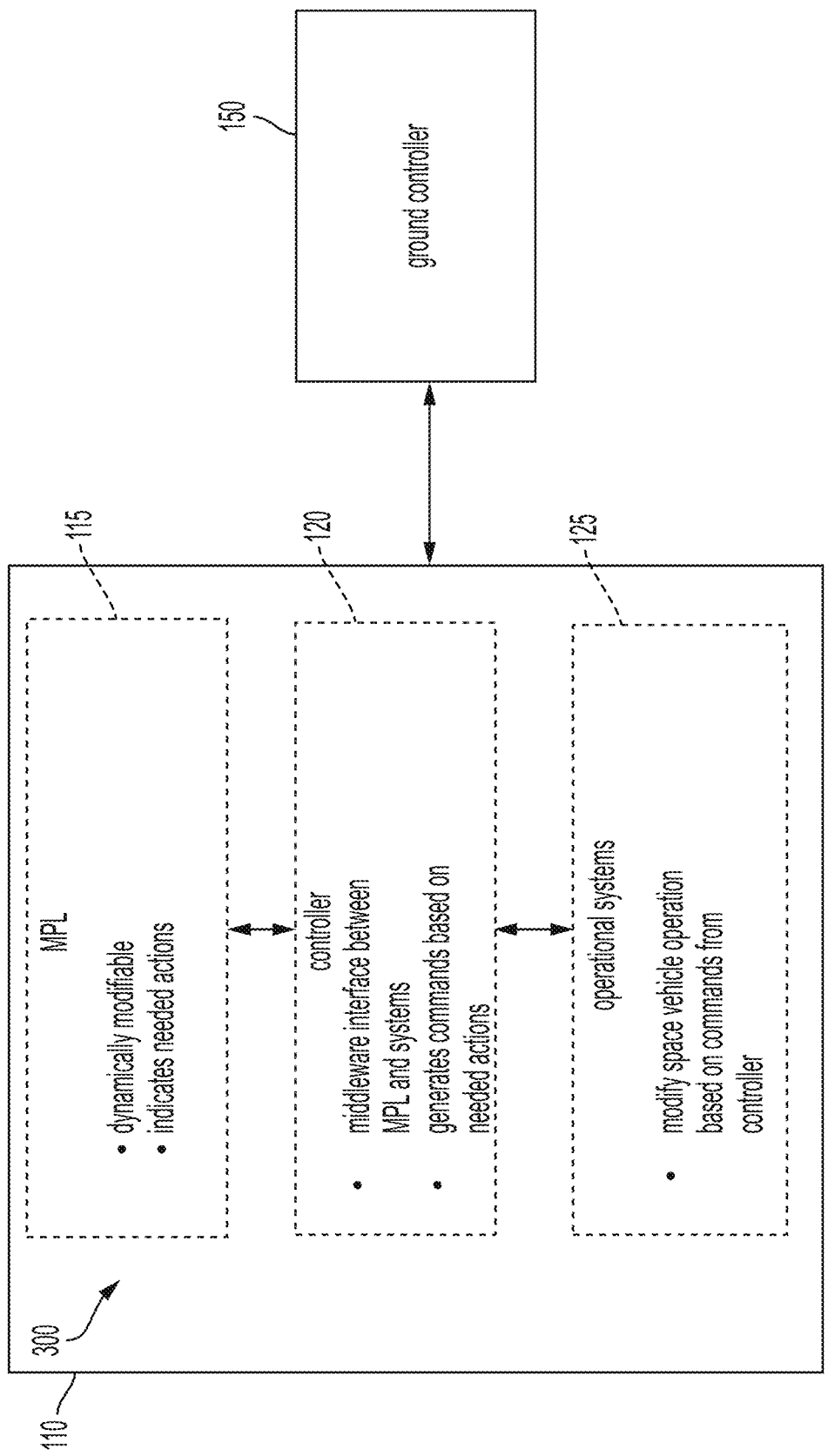
FIG. 3 details aspects of the testbed architecture of the space vehicle that includes star trackers for range determination according to one or more embodiments.

FIG. 3 details aspects of the testbed architecture 300 of the space vehicle 110 that includes star trackers 105 according to one or more embodiments. As shown, the testbed architecture 300 generally includes three functional portions or layers. The first layer is the MPL 115 that is dynamically modifiable. The algorithms implemented by the MPL 115 may be uploaded from the ground controller 150 during a mission by the space vehicle 110, for example. Based on implementing one or more algorithms, the MPL 115 may indicate actions to be taken with the space vehicle 110.

The second layer of the testbed architecture 300 is the controller 120, which functions as an interface between the MPL 115 and operational systems 125, which represent the third layer. The controller 120 is common to any MPL 115 and, thus, functions as middleware. Based on actions indicated by the MPL 115, the controller 120 may generate commands to the operational systems 125, which represent the third layer of the testbed architecture 300 and which implement the commands to affect operation of the space vehicle 110. The software processed by the controller 120 need not change based on different software (i.e., MPL 115) being implemented in the first layer.

Figure 4:
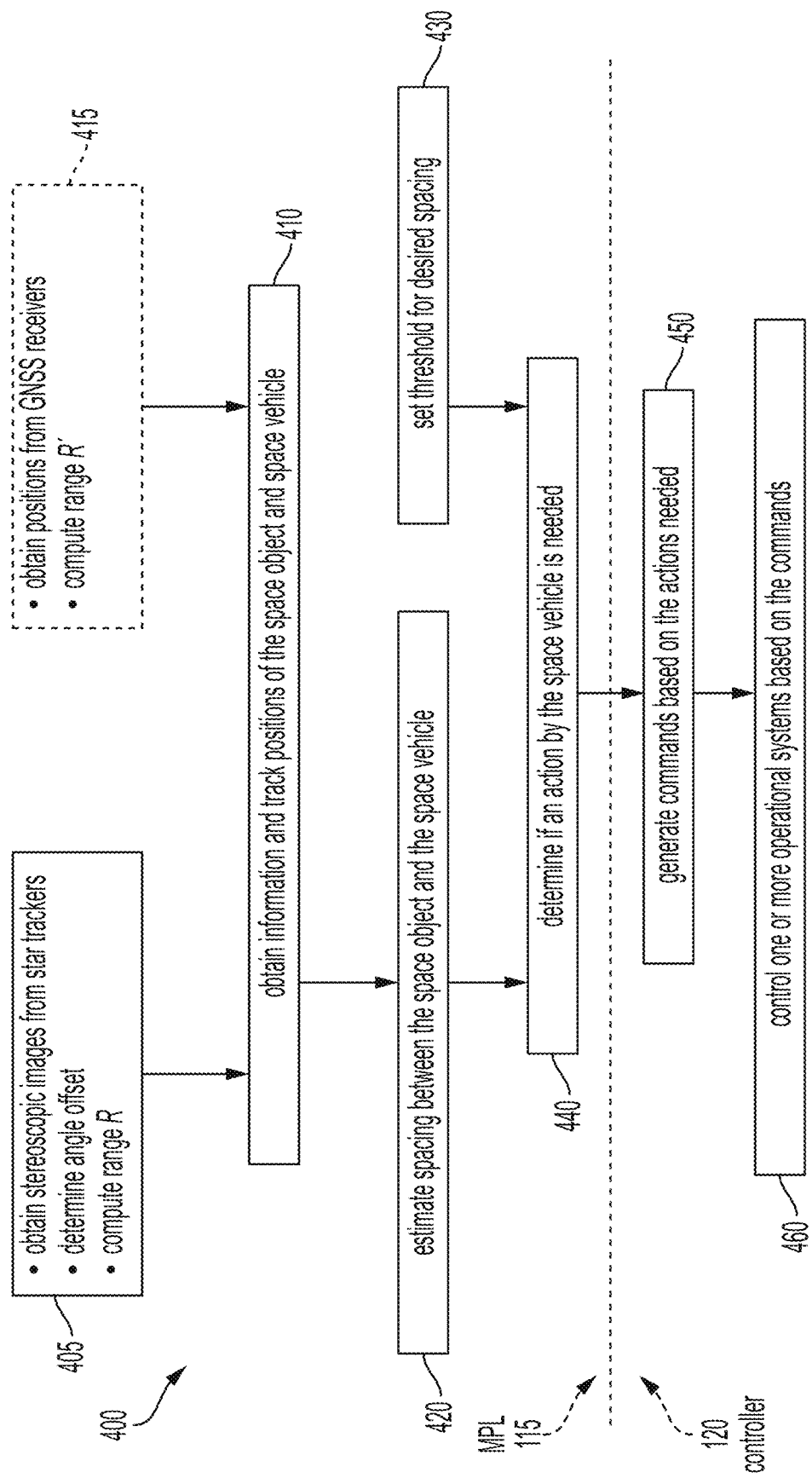
FIG. 4 is a process flow of a method of using the testbed architecture of the space vehicle to test proximity operations including range determination using the star trackers according to one or more embodiments.

FIG. 4 is a process flow of a method 400 of using the testbed architecture 300 of the space vehicle 110 to test proximity operations including range determination using the star trackers 105 according to one or more embodiments. As indicated, the processes may be performed by a combination of the MPL 115 and the controller 120. As illustrated, the processes at blocks 405 through 440 may be performed by the MPL 115. These processes (more specifically, the software that implements these processes) may be modified or changed dynamically. As also illustrated, the processes at blocks 450 and 460 may be performed by the controller 120 and may be reused for different MPL 115 without modification of any of the underlying software used by the controller 120.

At block 405, the processes used to determine the range R from the space vehicle 110 to the space object 210 using stereoscopic imaging by the star trackers 105 are summarized. These processes may be performed by one or more processors processing instructions of the MPL 115, which are dynamically modifiable and which may be stored by one or more memory devices. As discussed with reference to FIG. 2, the processes include obtaining images of the space object 210 (e.g., RSO 130) and determining the range R according to EQ. 1, for example.

At block 415, the processes used to determine the range R' from the space vehicle 110 to the space object 210 using GNSS receivers 215 are summarized. As discussed with reference to FIG. 2, the processes include obtaining the absolute position of the space vehicle 110 with a GNSS receiver 215 at the space vehicle 110 and obtaining the absolute position of the space object 210 with a GNSS receiver 215 at the space object 210. A difference in the three-dimensional positions may then be used to compute the range R'. As indicated, these processes are optional because a GNSS receiver 215 may not be available at the space object 210 or may not communicate with the space vehicle 110. One or more processors that process instructions of the MPL 115 may be used to compute the range R' based on the space object 210 communicating its position.

At block 410, obtaining information and tracking positions of the space object 210 and the space vehicle 110 is performed by the MPL 115. The tracking algorithm (e.g., using an extended Kalman filter) may be modified or replaced based on communication with the ground station 140, for example. The information used in the tracking may include telemetry data obtained from the ground station 140 and measurements obtained from an image processor that is part of the controller 120. The information used in the tracking may also include the range R obtained with the star trackers 105 and, when available, also the range R' obtained using the GNSS receivers 215. For example, the range estimates R and R' may be weighted as part of the predictor functionality, which is a known part of the Kalman filter tracking processes. Alternately, based on the MPL 115, a machine learning algorithm may determine the weights of the range estimates R and R' to be used when combining the estimates for use in the tracking.

At block 420, estimating spacing between the space object 210 and the space vehicle 110 (i.e., conjunction assessment) may rely on the information obtained at block 410. That is, based on the estimated/tracked positions of the space object 210 and the space vehicle 110, the spacing between them may be calculated. Like the tracking, at block 410, the assessment at block 420 may be performed using algorithms that are updated dynamically based on uploads from the ground station 140. At block 430, setting a threshold for a desired spacing between the space object 210 and the space vehicle 110 may be a function of a guidance controller that may be modified dynamically.

At block 440, determining if an action by the space vehicle 110 is needed may be performed by a mission orchestrator within the MPL 115 that may also be modified dynamically. Based on the particular algorithm being implemented, the mission orchestrator may compare estimated positions of the space object 210 and the space vehicle 110 with waypoints to determine if the space vehicle 110 should maneuver from its current position and, if so, in which direction. The determination may be provided to the controller 120 as actions needed by one or more operational systems 125.

At block 450, generating commands based on the actions indicated, at block 440, by the MPL 115 may be performed by a command generator within the controller 120. Regardless of changes within the MPL 115, its interface with the controller 120 need not change. As such, the controller 120 itself (i.e., the underlying software) need not change based on dynamic changes to aspects of the MPL 115. At block 460, the controller 120 controls one or more operational systems 125 (e.g., thrusters) based on the commands generated at block 450. The processes shown in FIG. 4 may be performed iteratively. For example, control of one or more operational systems 125 (at block 460) may be followed by another iteration beginning with obtaining information (at block 410).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A system in a space vehicle, the system comprising:
a first star tracker disposed at a first location on or near the space vehicle, the first star tracker configured to obtain first images of a space object deployed by the space vehicle and stars;
a second star tracker disposed at a second location on or near the space vehicle, at a distance D from the first location, the second star tracker configured to obtain second images of the space object and the stars and the first images and the second images being stereoscopic images;
a processor configured to:
    process a massless payload uploaded from a ground station and received at the space vehicle in a state in which the space vehicle is deployed and is spaced apart from the ground station, wherein the processor is configured to apply an algorithm configured to determine one or more estimates of a range from the space vehicle to the space object deployed by the space vehicle or dynamically modify the algorithm based on the massless payload;
    store the algorithm to a memory of the space vehicle;
    determine an estimate of the range from the space vehicle to the space object based on the first images and the second images; and
    process the estimate of the range using the algorithm; and
a controller configured to control the space vehicle in association with performing one or more actions by the space vehicle with respect to the space object deployed by the space vehicle, based on the processing of the estimate of the range using the algorithm, wherein the one or more actions comprise rendezvous proximity operation (RPO) maneuvers around the space object deployed by the space vehicle.

2. The system according to claim 1, wherein the processor is configured to determine xa as a position of the space object in one dimension based on the first images and to determine xb as a position of the space object in the one dimension based on the second images.

3. The system according to claim 2, wherein the processor is configured to compute the range R from the space vehicle to the space object as:

$$R = f \cdot \left(\frac{D}{xa + xb}\right),$$

where f is the focal length of the first star tracker and the second star tracker.

4. The system according to claim 1, wherein the processor is further configured to determine a second estimate of the range from the space vehicle to the space object based on an absolute position of the space vehicle and an absolute position of the space object from a global navigation satellite system.

5. The system according to claim 4, wherein the processor is configured to weight the estimate of the range and the second estimate of the range as part of a tracking process using a Kalman filter associated with the algorithm.

6. The system according to claim 4, wherein the processor is configured to implement a machine learning algorithm to weight the estimate of the range and the second estimate of the range and determine a combined estimate of the range from the space vehicle to the space object.

7. The system according to claim 4, wherein the algorithm weights the estimate of the range and the second estimate of the range and determines a combined estimate of the range from the space vehicle to the space object.

8. The system according to claim 7, wherein the massless payload includes one or more algorithms to determine the one or more actions to be taken by the space vehicle based on the combined estimate of the range from the space vehicle to the space object.

9. The system according to claim 8, wherein the controller is configured to control one or more operational systems to perform the one or more actions indicated by the massless payload, wherein the controller software is an interface between the massless payload and the operational systems and does not change based on dynamic changes in the massless payload.

10. The system according to claim 1, wherein:
the processor is further configured to
process the estimate of the range using the modified algorithm; and
the controller is further configured to control the space vehicle in association with performing the one or more actions by the space vehicle with respect to the space object deployed by the space vehicle, based on the processing of the estimate of the range using the modified algorithm.

11. A method comprising:
disposing a first star tracker at a first location on or near a space vehicle, the first star tracker configured to obtain first images of a space object deployed by the space vehicle and stars;
disposing a second star tracker at a second location on or near the space vehicle, at a distance D from the first location, the second star tracker configured to obtain second images of the space object and the stars and the first images and the second images being stereoscopic images;
providing instructions to a processor comprised in the space vehicle to:
  process a massless payload uploaded from a ground station and received at the space vehicle in a state in which the space vehicle is deployed and is spaced apart from the ground station;
  apply an algorithm configured to determine one or more estimates of a range from the space vehicle to the space object deployed by the space vehicle or dynamically modify the algorithm based on the massless payload;
  store the algorithm to a memory of the space vehicle;
  determine an estimate of the range from the space vehicle to the space object based on the first images and the second images; and
  process the estimate of the range using the algorithm; and
controlling, by a controller device, the space vehicle in association with performing one or more actions by the space vehicle with respect to the space object deployed by the space vehicle, based on the processing of the estimate of the range using the algorithm, wherein the one or more actions comprise rendezvous proximity operation (RPO) maneuvers around the space object deployed by the space vehicle.

12. The method according to claim 11, wherein the providing the instructions includes instructions to determine xa as a position of the space object in one dimension based on the first images and to determine xb as a position of the space object in the one dimension based on the second images.

13. The method according to claim 12, wherein the providing the instructions includes instructions to compute the range R from the space vehicle to the space object as:

$$R = f \cdot \left( \frac{D}{xa + xb} \right),$$

where f is the focal length of the first star tracker and the second star tracker.

14. The method according to claim 11, wherein the providing the instructions includes instructions to determine a second estimate of the range from the space vehicle to the space object based on an absolute position of the space vehicle and an absolute position of the space object from a global navigation satellite system.

15. The method according to claim 14, wherein the providing the instructions includes instructions to weight the estimate of the range and the second estimate of the range as part of a tracking process using a Kalman filter associated with the algorithm.

16. The method according to claim 14, wherein the providing the instructions includes instructions to implement a machine learning algorithm to weight the estimate of the range and the second estimate of the range and determine a combined estimate of the range from the space vehicle to the space object.

17. The method according to claim 14, wherein the algorithm weights the estimate of the range and the second estimate of the range and determines a combined estimate of the range from the space vehicle to the space object.

18. The method according to claim 17, wherein the massless payload includes one or more algorithms to determine the one or more actions to be taken by the space vehicle based on the combined estimate of the range from the space vehicle to the space object.

19. The method according to claim 18, further comprising configuring the controller to control one or more operational systems to perform the one or more actions indicated by the massless payload, wherein the configuring the controller is as an interface between the massless payload and the operational systems with software that does not change based on dynamic changes in the massless payload.

20. The method according to claim 11, further comprising:
providing further instructions to the processor to
process the estimate of the range using the modified algorithm; and
controlling, by the controller device, the space vehicle in association with performing the one or more actions by the space vehicle with respect to the space object deployed by the space vehicle, based on the processing of the estimate of the range using the modified algorithm.

* * * * *